United States Patent [19]
Hatsukano et al.

[11] 3,813,564
[45] May 28, 1974

[54] FLIP-FLOP CIRCUIT

[75] Inventors: Yoshikazu Hatsukano; Kosei Nomiya; Shuichi Torii, all of Tokyo, Japan

[73] Assignee: Hitachi, Ltd., Tokyo, Japan

[22] Filed: June 26, 1973

[21] Appl. No.: 373,761

[30] Foreign Application Priority Data

June 28, 1972 Japan .............................. 47-64018

[52] U.S. Cl. .............................................. 307/279
[51] Int. Cl. .......................................... H03k 3/286
[58] Field of Search ............................ 307/279, 205

[56] References Cited

UNITED STATES PATENTS

| | | | |
|---|---|---|---|
| 3,614,476 | 10/1971 | Teranishi | 307/279 |
| 3,656,010 | 4/1972 | Huyben et al. | 307/279 |
| 3,676,700 | 7/1972 | Buchanan | 307/279 X |

*Primary Examiner*—John S. Heyman
*Attorney, Agent, or Firm*—Craig and Antonelli

[57] ABSTRACT

A flip-flop circuit includes a first inverter including a first insulated gate field-effect transistor (MISFET), a second MISFET for storage, and a third MISFET for control of writing and a fourth MISFET, the second and third MISFET's being connected in series between the first and fourth MISFET's. A fifth MISFET for receiving an input signal and a sixth MISFET for control of writing are connected between the first and fourth MISFET's. A second inverter including a seventh MISFET for storage and a MISFET for a load thereof are connected in series with each other, an output terminal of the second inverter being feedback-connected to an input electrode of the second MISFET. An eighth MISFET for transfer is connected between an output terminal of the first inverter and an input electrode of the seventh MISFET. The third MISFET is rendered non-conductive and the sixth MISFET conductive at writing when at least the fourth and eighth MISFET's are conductive.

6 Claims, 6 Drawing Figures

FLIP-FLOP CIRCUIT

BACKGROUND OF THE INVENTION

1. Field of the Invention

The present invention relates to a flip-flop circuit and more particularly to a static flip-flop circuit composed of insulated gate field-effect transistors.

2. Description of the Prior Art

Flip-flop circuits composed of insulated gate field-effect transistors (hereinafter simply termed transistors) are broadly classified as dynamic flip-flop circuits and static flip-flop circuits. Since the dynamic flip-flop circuit is simple in construction, it is often employed in devices such as shift registers in which a number of flip-flop circuits are connected in cascade. In the case where the period for writing information into the flip-flop circuit is long, the static flip-flop circuit having a feedback path is more suitable.

Examples of typical static flip-flop circuits are shown in FIGS. 1 and 2. The static flip-flop circuit in FIG. 1 is constructed of a first inverter circuit composed of transistors $Q_{21}$ and $Q_{22}$, a second inverter circuit composed of transistors $Q_{23}$ and $Q_{24}$, a third inverter circuit composed of transistors $Q_{25}$ and $Q_{26}$, and transistors $Q_{27}$ – $Q_{29}$ which serve as transfer gates. The second inverter circuit and the third inverter circuit are connected in cascade. The output terminal of the third inverter circuit is feedback-connected through the transfer gate transistor $Q_{29}$ to the input terminal of the second inverter circuit, and information is statically retained by the feedback loop. The contents of the information to be retained by the feedback loop are determined by an input signal $V_{in}$, when the transfer gate transistor $Q_{27}$ is turned on by a writing control clock pulse $\phi_{1x}$.

The gate electrodes of the transistors $Q_{28}$ and $Q_{29}$ are connected to receive clock pulses $\phi_2$, shown in FIG. 3*b*, while the gate electrode of the transistor $Q_{27}$ receives the writing control clock pulses $\phi_{1x}$, which differ in phase from the pulses $\phi_2$. The respective drain electrodes of the load transistors $Q_{21}$, $Q_{23}$ and $Q_{25}$ are connected to receive a negative DC voltage $V_{DD}$, and the respective gate electrodes are connected to a negative DC voltage $V_{GG}$, which is larger than the voltage $V_{DD}$ by the threshold voltage $V_{th}$ of the transistors, i.e., more than ( $|V_{GG}|=|V_{DD}|+|V_{th}|$ ).

On account of the well-known substrate effect, the voltage to be applied to the gate electrodes of the transfer gate transistors $Q_{27}$ – $Q_{29}$ requires as high a level as the load transistors $Q_{21}$, $Q_{23}$ and $Q_{25}$ (for example, the same level as that of the voltage $V_{GG}$). The substrate effect arises for the reason that, in the case where the substrates of the respective transistors are commonly connected to a reference potential point (for example, in an integrated semiconductor circuit, the respective transistors have a single common semiconductor substrate), a voltage is impressed between the source electrode of each transistor and the substrate. The clock pulses $\phi_1$ and $\phi_2$ are therefore generated at high voltage level outside the integrated semiconductor circuit device.

On the other hand, the writing control clock pulse $\phi_{1x}$ is generated by taking, as shown in FIG. 3*a*, the logic result between the clock pulse $\phi_1$ and a control signal X generated in, for example, an electronic computer. The logic result is established by a logic circuit consisting of transistors $Q_{31}$ –$Q_{35}$, the logic circuit being similarly incorporated within the integrated semiconductor circuit in which the flip-flop circuit is constructed. Herein, the output potential of the logic circuit falls to an electric potential approximately equal to the voltage $V_{DD}$. In general, accordingly, in order to raise the output potential, level conversion is performed by a circuit outside the integrated semiconductor circuit device to convert the output pulse to a clock control pulse of high level. It is also thought that, with an identical integrated semiconductor circuit device, the output level of the logic circuit can be raised by additionally providing one power source. However, it is inevitable that the number of external terminals of the integrated circuit device must be increased with such an arrangement, and therefore the specification of the integrated circuit device is subject to restriction.

When, in the static flip-flop circuit of FIG. 1, the load transistors $Q_{21}$, $Q_{23}$ and $Q_{25}$ are provided for clock drive in order to reduce power consumption, so-called charge sharing arises. It is accordingly feared that an erroneous operation will occur.

On the other hand, with the static flip-flop circuit of FIG. 2, since the source electrodes of the transistors $Q_7$ and $Q_8$ for control of writing are grounded, the aforesaid substrate effect does not occur, and the voltage level of the writing control pulse $\phi_{1x}$ may be low. Since the output terminal of an inverter circuit composed of transistors $Q_2$ and $Q_4$ is directly feedback-connected to the input terminal of an inverter circuit composed of transistors $Q_1$ and $Q_5$ without the intervention of the transfer gate $Q_{29}$ of FIG. 1, the aforesaid charge sharing problem does not result, and the load transistors $Q_1$ and $Q_2$ can be clock-driven. As will now be explained, however, another problem arises with the circuit of FIG. 2.

The clock control pulse $\phi_{1x}$ is formed by the logic circuit consisting of the transistors $Q_{31}$ – $Q_{35}$, which receives the clock pulse $\phi_1$ and the control signal X as its input signals, as shown in FIG. 3*a*. In consequence, the clock control pulse $\phi_{1x}$ lags over the clock pulse $\phi_1$ as shown in FIG. 3*b*. Accordingly, the period of time during which the clock pulse $\phi_1$ and the clock control pulse $\phi_{1x}$ overlap, in other words, the period of time during which transistors $Q_3$ and $Q_7$ and transistors $Q_3$ and $Q_8$ are simultaneously rendered conductive for the writing operation, is made shorter than the pulse width of the clock pulse $\phi_1$ by the delay of the logic circuit, as illustrated by the hatched portion seen in FIG. 3*b*. The fact that the time interval of the concurrent conduction of the transistors is short, leads to the result that the period of time for writing the input signal $V_{in}$ into the flip-flop circuit is short. Unfortunately, this may cause an erroneous operation. For example, if the time interval of simultaneous conduction of the transistors $Q_7$ and $Q_3$ is short, the possibility of erroneous operation due to the relationship between the discharge time constant of a circuit made up of the transistors $Q_3$, $Q_4$, $Q_6$ and $Q_7$, a voltage retained in the gate capacity of the transistor $Q_4$ and the threshold voltage $V_{th}$ of the transistor $Q_4$ may result. If the simultaneous conduction time of the transistors $Q_8$ and $Q_3$ is short, the possibility of an erroneous operation due to the relationship between the charge time constant of a circuit consisting of the transistors $Q_1$, $Q_3$ and $Q_4$, the supply voltage $V_{DD}$ and the threshold voltage $V_{th}$ of the transistor $Q_4$ may occur. The latter case produces an especially difficult problem during charging. In order to prolong the overlapping period of time between the clock pulse $\phi_1$ and the clock control pulse $\phi_{1x}$, the pulse width of the clock pulse $\phi_1$ may be made sufficiently long. To this end, however, it is necessary to lower the clock frequency, which makes it inevitable that the speed of the shift register or the like must be lowered.

SUMMARY OF THE INVENTION

It is accordingly the principle object of the present invention to provide a flip-flop circuit which can utilize a writing control signal of low level and by which the period of time during which the writing control signal and a clock pulse overlap can be made equal to the full period of timme of the clock pulse.

Another object of the present invention is to provide a flip-flop circuit which is miniaturized, in other words, the occupying area of which within an integrated semiconductor circuit is made small.

The other objects of the present invention will be apparent from the following detailed description when read in conjunction with the accompanying drawings.

DESCRIPTION OF THE PREFERRED EMBODIMENT

Figure 1:
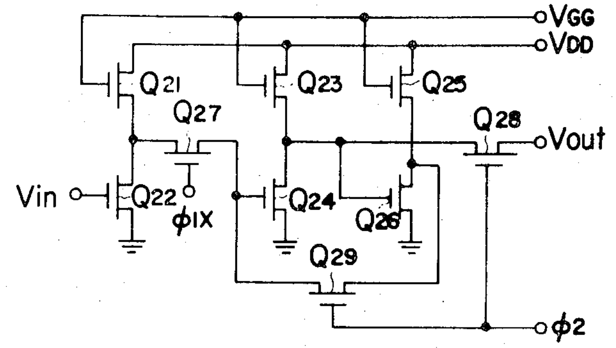
FIG. 1 PRIOR ART
FIGS. 1 and 2 are schematic circuit diagrams of the prior art static flip-flop circuit previously expalined.
Figure 2:
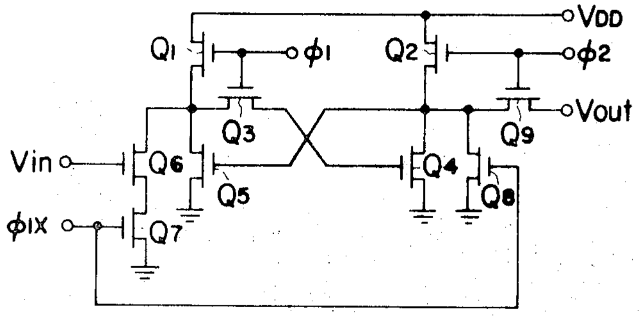
FIG. 2 PRIOR ART
Figure 3A:
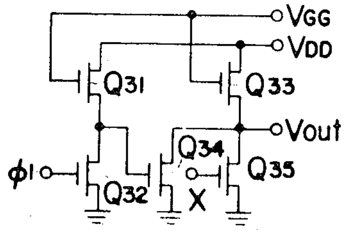
FIG. 3*a* is a schematic diagram of the logic circuit referred to in the previous description for producing the writing control signal $\phi_{1x}$ of the clock pulse $\phi_1$ and the control signal X.
Figure 3B:
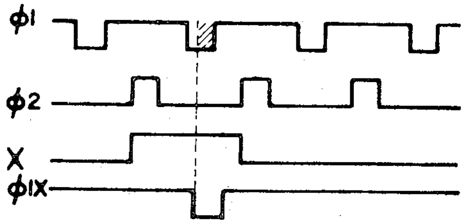
FIG. 3*b* illustrates the clock pulses $\phi_1$ and $\phi_2$, the control signal X and the writing control clock pulse $\phi_{1x}$.
Figure 4:
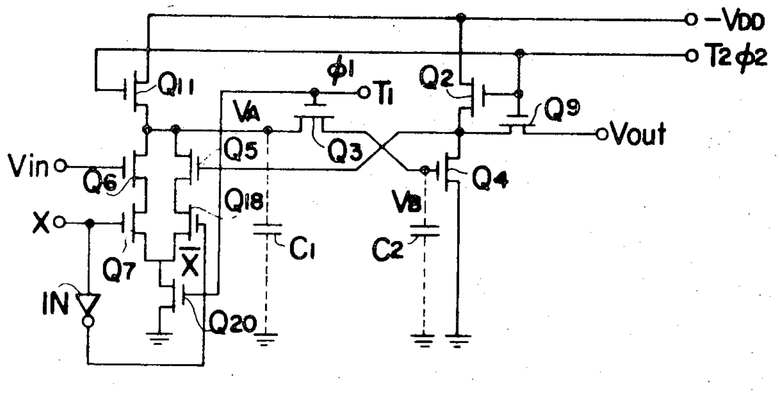
FIG. 4 is a schematic circuit diagram showing an embodiment of a flip-flop circuit according to the present invention.

FIG. 4 shows an embodiment of the static flip-flop circuit according to the present invention. In the figure, the same parts as, or parts having the same function as, the circuit of FIG. 2 are identified by common symbols. The elements $Q_{11}$, $Q_{18}$ and $Q_{20}$ in FIG. 4 are MOS field-effect transistors. A capacitor $C_1$ corresponds to the junction capacities of the transistors $Q_5$, $Q_6$ and $Q_{11}$ and the capacities of connections for coupling these transistors to the transistor $Q_3$. A capacitor $C_2$ corresponds to the gate capacity of the transistor $Q_4$ and the connection capacity between the transistors $Q_3$ and $Q_4$. The capacity of the capacitor $C_1$ is set at a value larger than the capacity of the capacitor $C_2$. As the capacitor $C_1$, a separate capacitor may be employed, connected between the drain electrode of the transistor $Q_5$ and ground.

The drain electrode of the transistor $Q_{18}$ is connected to the source electrode of the transistor $Q_5$, and the gate electrode is connected to receive a signal $\overline{X}$, which corresponds to an inverted writing control signal X, by way of an inverter IN. The drain electrode of the transistor $Q_{20}$ is commonly connected to the source electrodes of the transistors $Q_7$ and $Q_{18}$, while the source electrode is grounded. In this case, the gate electrode of the transistor $Q_{20}$ is connected to receive the clock pulse $\phi_1$. Further, unlike the gate electrode of the transistor $Q_1$ in FIG. 2, the gate electrode of the transistor $Q_{11}$ is supplied with the clock pulse $\phi_2$ The writing control signal X applied to the gate electrode of the transistor $Q_7$ is adapted to bring the transistor $Q_7$ into the "on" state and the transistor $Q_{18}$ into the "off" state while at least the transistors $Q_3$ andd $Q_{20}$ are in the "on" state during writing of information.

The operation of the static flip-flop circuit according to the present invention will now be explained with reference to the waveform diagram of FIG. 5. In the figure, the upper level of each signal indicates the logic 1 (ground potential), while the lower level indicates the logic 0 (negative potential). The writing control signal X employed herein is one which, similarly to the input signal $V_{in}$, is synchronized with the clock pulses $\phi_2$ and has a pulse width equal to the period of the clock pulses $\phi_2$.

1. Before the clock pulse $\phi_1$ becomes 0 to render the transistors $Q_{20}$ and $Q_3$ conductive, the capacitor $C_1$ is previously charged during the 0 period of the clock pulse $\phi_2$. In the waveform diagram of FIG. 5, the capacitor $C_1$ is charged between times $t_1$ and $t_1'$.

2. When the writing control signal X becomes 0, the transistor $Q_7$ becomes conductive and the transistor $Q_{18}$ becomes non-conductive. When the clock pulse $\phi_1$ falls to 0 in this period, whether or not the charges stored in the capacitor $C_1$ or $C_2$ are discharged through the transistors $Q_3$, $Q_6$, $Q_7$ and $Q_{20}$ is determined irrespective of the previous old information which has been stored in the transistor $Q_5$ (since the transistor $Q_{18}$ is non-conductive) and in dependence on new information $V_{in}$. The result is stored in the capacitor $C_2$.

Figure 5:
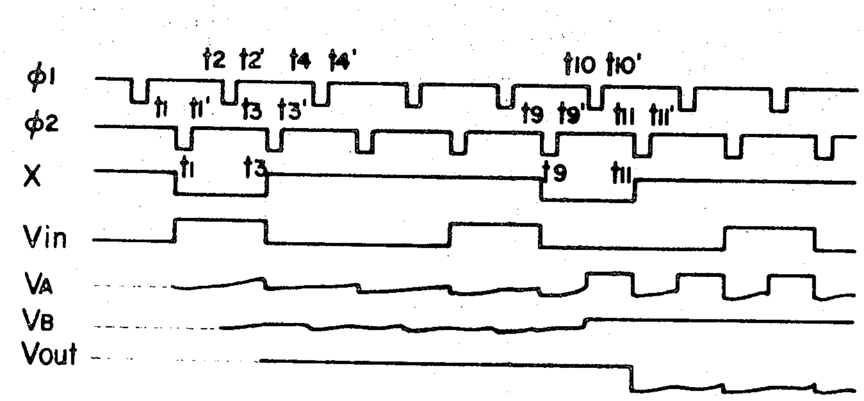
FIG. 5 is a waveform diagram for explaining the circuit of FIG. 4.

Referring to FIG. 5, since the writing control signal X is 0 during the period $t_1 - t_3$, the transistor $Q_7$ is conductive and the transistor $Q_{18}$ non-conductive during the period. Since the transistors $Q_3$ and $Q_{20}$ are conductive during the period $t_2 - t_2'$, the charges accumulated in the capacitor $C_1$ or $C_2$ are determined by the discharge irrespective of the previous information stored in the transistor $Q_5$ and in dependence on whether the transistor $Q_6$ is rendered conductive or not (that is, by the input signal $V_{in}$).

Assuming that the input signal $V_{in}$ is 1 during this period, as is illustrated in FIG. 5, the charges which have been previously accumulated in the capacitor $C_1$, or the charges which have been accumulated in the capacitor $C_2$ before the time $t_1$, are not discharged. Accordingly, either case occurs where the charges are left in the capacitor $C_2$ as they are or where charges are supplied thereto anew from the capacitor $C_1$. In either case, charges are present in the capacitor $C_2$.

As illustrated in FIG. 5, the writing operation is similarly performed in a period from time $t_9$ to time $t_{11}$. During the period, however, the input signal $V_{in}$ is 0, so that the charges which have been accumulated in the capacitors $C_1$ and $C_2$ are discharged through the transistors $Q_3$, $Q_6$, $Q_7$ and $Q_{20}$. In this way, the writing of the input signal $V_{in}$ into the flip-flop circuit is completed.

3. On the other hand, when the writing control signal X becomes 1, the transistor $Q_7$ becomes non-conductive, and the transistor $Q_{18}$ becomes conductive. When the clock pulse $\phi_1$ falls to 0 in the period, the charges accumulated in the capacitor $C_1$ or $C_2$ are determined as to whether thay are discharged through the transistors $Q_3$, $Q_5$, $Q_{18}$ and $Q_{20}$ or not, independently of the input signal $V_{in}$ (since the transistor $Q_7$ is non-conductive) and by the previous old information stored in the transistor $Q_5$. The result is stored in the capacitor $C_2$ again.

Referring to FIG. 5, since the writing control signal X is 1 during a period from time $t_3$ to time $t_9$, the transistor $Q_7$ is non-conductive and the transistor $Q_{18}$ conductive during the period. Since the transistors $Q_3$ and $Q_{20}$ are conductive during a period $t_4 - t_4'$, the charges accumulated in the capacitor $C_1$ or $C_2$ are determined as to the discharge irrespective of the input signal $V_{in}$ and in dependence on whether the transistor $Q_5$ is rendered conductive or not, that is, by the previous old information accumulated in the gate capacity of the transistor $Q_5$. The information to be stored in the transistor $Q_5$ is determined by the information stored in the capacitor $C_2$. It will be 1 if the information stored in the capacitor $C_2$ is 0, and it will be 0 if the same is 1. Therefore, since the information 0 has been perfectly stored in the capacitor $C_2$ at the time $t_2'$ as in explanation (2) above, the information 1 is stored in the transistor $Q_5$, and the charges which have been accumulated in the capacitors $C_1$ and $C_2$ are not discharged. In consequence, the charges are left in the capacitor $C_2$ as they are, and some charges having leaked therefrom in a period $t_2' - t_4$ are again supplied thereto from the capacitor $C_1$. In other words, while the writing control signal X is 1, the information once stored in the transistors $Q_4$ and $Q_5$ are retained as they are.

4. During a period during which the clock pulse $\phi_2$ is of 0, an inverted signal corresponding to the information stored in the capacitor $C_2$ is derived as the output signal $V_{out}$ from the transistor $Q_9$. For example, negative charges are accumulated in the capacitor $C_2$ during a period $t_3 - t_3'$, so that the transistor $Q_4$ is conductive and the output signal $V_{out}$ is at ground potential (logic 1). Similarly, the transitor $Q_4$ is non-conductive during a period $t_{11} - t_{11}'$, so that the output signal $V_{out}$ is 0. In this manner, the reading operation is carried out.

The static flip-flop circuit according to the present invention as has thus far been described, has the following merits:

1. Since the pulse width of the clock pulse $\phi_1$ can be exploited by 100 percent, the frequency of the clock pulses can be raised.

When the writing control signal X, as shown in FIG. **3*b* or FIG. 5, is used as the writing control pulses in the static flip-flop circuit of FIG. 2, the following erroneous operation arises. In the case where the writing control signal is 0, the transistor $Q_8$ is always rendered conductive during the reading operation (when the clock pulse $\phi_2$ becomes 0**), and the output signal $V_{out}$ is always brought to ground potential independently of the input signal $V_{in}$. More specifically, in order to disconnect the feedback loop and offer a preference to the input signal in case of writing a new information, the transistor $Q_8$ is rendered conductive to make the gate voltage of the transistor $Q_5$ zero volt. The prior-art circuit therefore cannot employ such writing control signal X.

In contrast, with the static flip-flop circuit according to the present invention, as shown in FIG. 4, the transistor $Q_{18}$ is rendered non-conductive in order to disconnect the feedback loop and give priority to the input signal $V_{in}$ in the case of writing a new information. Therefore, the gate voltage of the transistor $Q_4$ or the output signal $V_{out}$ is not influenced by the control signal X at all, and the aforesaid object of the present invention is accomplished. The writing control signal X may become 0 during the writing operation when at least the clock pulse $\phi_1$ becomes 0. The writing control signal $\overline{X}$ need be a signal which becomes 1 at least at that time in order to make unrelated the previous information accumulated in the transistor $Q_5$.

2. As compared with the circuit in FIG. 2, the embodiment in FIG. 4 is larger by the two additional transistors employed. With the circuit of the present invention, however, the transistor $Q_{11}$ for charging the capacitor $C_1$ and the series circuit member of the transistors $Q_6$, $Q_7$ and $Q_{20}$, as well as the series circuit member of the transistors $Q_5$, $Q_{18}$ and $Q_{20}$, the series circuit members forming under the specified conditions the conduction paths for discharging charges accumulated in the capacitor $C_1$, separately effect the charging and discharging operations for the capacitor $C_1$ by the use of the clock pulses $\phi_1$ and $\phi_2$, which differ in phase. Hence, the necessity for considering the resistance ratio between both the constituents as in the prior art is eliminated. It is accordingly unnecessary to form the transistors $Q_5$, $Q_6$, $Q_7$, $Q_{18}$ and $Q_{20}$ at larger areas relative to the transistor $Q_{11}$ in the integrated semiconductor circuit. In substance, the circuit of the invention can be formed in an area smaller than that of the circuit in FIG. 2.

3. The source electrodes of the transistors $Q_7$ and $Q_{18}$ are essentially equivalent to being grounded. Consequently, the substrate effect does not become a problem, which makes it possible to use a writing control signal of low level.

Although, in the embodiment, the transistor $Q_2$ is employed as the load of the transistor $Q_4$, it may be replaced with a usual impedance element or an element having a similar performance so as to drive the transistor $Q_4$ with a DC voltage. Although, in the embodiment, the input signal $V_{in}$ is supplied to the transistor $Q_6$, it may of course be made to feed the input signal $V_{in}$ to the transistor $Q_7$ and to apply the writing control signal X to the transistor $Q_6$. Although, in the embodiment, the MOS field-effect type transistor is employed, it is a matter of course that they are not restricted thereto insofar as the MIS field-effect type may be utilized.

As stated above, in accordance with the flip-flop circuit of the present invention, such various advantageous results are produced that the pulse width of the clock pulse $\phi_1$ can be effectively exploited by 100 percent and that the occupying area of the flip-flop circuit in an integrated circuit can be made small.

What is claimed is:

1. A flip-flop circuit comprising a voltage source, a first inverter circuit including a first impedance element and first and second insulated gate field-effect transistors connected in series across said voltage source, third and fourth insulated gate field-effect transistors connected in series across said first insulated gate field-effect transistor, a second inverter circuit including a second impedance element in series with a fifth insulated gate field-effect transistor across said voltage source, a sixth insulated gate field-effect transistor connected between an output terminal of said first inverter circuit and the input electrode of said fifth insulated gate field-effect transistor, a seventh insulated gate field-effect transistor connected in series between said first and second insulated gate field-effect transistors and having its input electrode connected to the input electrode of one of said third and fourth insulated gate field effect transistors, and output means for deriving an output signal from the input electrode of said fifth insulated gate field-effect transistor, the output terminal of said second inverter circuit being feedback connected to the input electrode of said first insulated gate field-effect transistor.

2. A flip-flop circuit as defined in claim 1 wherein said first and second impedance elements consist of eighth and ninth insulated gate field-effect transistors.

3. A flip-flop circuit as defined in claim 2 further including gating means for applying first gating signals to the input electrode of said second insulated gate field-effect transistor and second gating signals to the input electrodes of said eighth and ninth insulated gate field effect transistors.

4. A flip-flop circuit as defined in claim 3 wherein said gating means is connected to the input electrode of said sixth insulated gate field-effect transistor to apply first gating signals thereto.

5. A flip-flop circuit as defined in claim 4 wherein said output means includes a tenth insulated gate field-effect transistor connected between the point of connection of said fifth and ninth insulated gate field-effect transistors and an output terminal.

6. A flip-flop circuit as defined in claim 5 wherein the input electrode of said tenth insulated gate field-effect transistor is connected to said gating means to receive said second gating signals.

* * * * *